Patented Aug. 7, 1934

1,968,905

UNITED STATES PATENT OFFICE 1,968,905

PRODUCTION OF ARYL MERCAPTO COMPOUNDS

Keith William Palmer, Fartown, Huddersfield, England, assignor to Imperial Chemical Industries Limited, a corporation of Great Britain No Drawing. Application July 2, 1932, Serial No. 620,731. In Great Britain July 6, 1931

5 Claims. (Cl. 260—154)

This invention relates to the production of aryl mercapto compounds and more particularly refers to the production of mercapto phenols.

It is an object of this invention to produce valuable organic compounds. A further object is to produce organic compounds which are very useful in dyeing processes. Additional objects will appear hereinafter.

These objects are accomplished by the present invention wherein a dihydroxy-diphenyl-sulfide is reacted with a mixture of alkali sulfide and alkali hydroxide.

The invention will be more completely understood by reference to the following example, in which the quantities are stated in parts by weight:

Example I 180 parts of crystallized sodium sulfide ($9H_2O$) and 40 parts of flake caustic soda were mixed and melted together at about 80° C. 109 parts of 4 - 4' - dihydroxy - diphenyl - sulfide was added. The stirred mixture was heated for about 20 hours at a temperature rising to about 180° C. in a reflux apparatus so arranged that water could escape. The viscous mass was dissolved in 1000 parts of water and hydrochloric acid was added until the solution exhibited mineral acidity. The oil, which separates, was taken up in ether and the product, monothiohydroquinone, separated by distillation in the usual way.

In carrying out the process of the present invention the diphenyl nucleus may have various other groups substituted thereon than the hydroxy groups, referred to in the above example, for instance, the alkyl group, without interfering with the utility of the resulting product. Also other alkali sulfides and hydroxides may be used in place of the sodium compounds previously referred to, as is well known to one skilled in the art.

The reaction herein described probably proceeds according to the following equations:

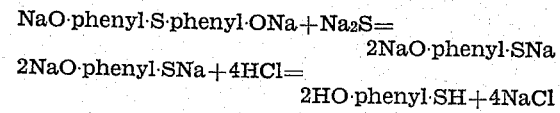

The products produced herein have many uses in industry, particularly in the dye industry. Their ease of preparation, by the process herein described, in addition to their multitudinous uses makes them very important from a commercial standpoint.

As many apparently widely different embodiments of this invention may be made without departing from the spirit and scope thereof, it is to be understood that I do not limit myself to the specific embodiments thereof except as defined in the appended claims.

I claim:

1. A process which comprises reacting a di-(hydroxy-phenyl)-sulfide with a mixture of alkali sulfide and alkali hydroxide.

2. A process which comprises reacting a di-(hydroxy-phenyl)-sulfide with a mixture of sodium sulfide and sodium hydroxide.

3. A process which comprises reacting 4-4'-dihydroxy-diphenyl-sulfide with a mixture of sodium sulfide and sodium hydroxide.

4. A process of producing a mercapto phenol which comprises reacting a di-(hydroxy-phenyl)-sulfide with a melt of an alkali metal sulfide and an alkali metal hydroxide.

5. A process for producing monothio-hydroquinone, which comprises heating substantially 109 parts of 4,4'-dihydroxy-diphenyl-sulfide in a melt consisting substantially of 180 parts of crystallized sodium sulfide and 40 parts of caustic soda, dissolving the reaction mass in water and acidifying the solution with a mineral acid, separating the oily layer and recovering therefrom monothiohydroquinone.

KEITH WILLIAM PALMER.